March 28, 1961 F. SECRETAN 2,977,538
PHASE MEASURING SYSTEM
Filed Dec. 11, 1958 2 Sheets-Sheet 1
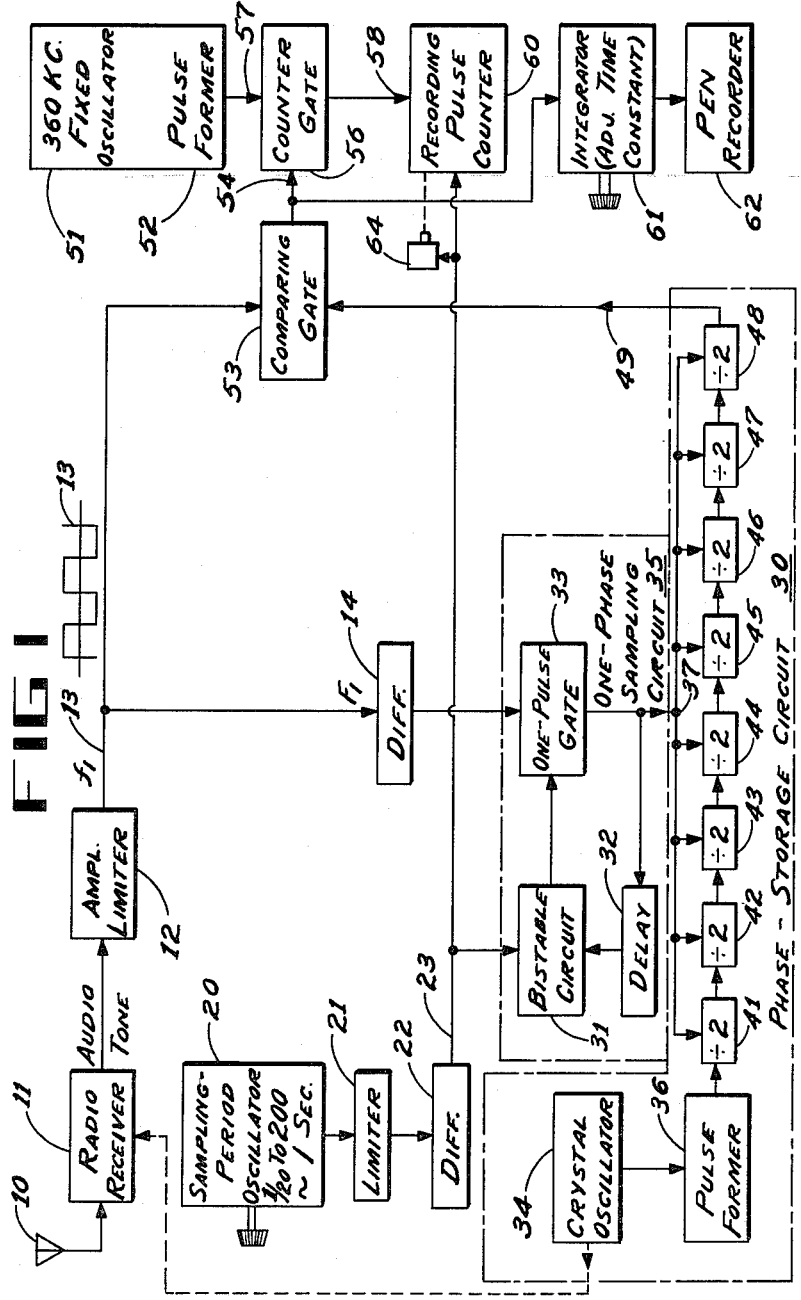
INVENTOR.
FRANK SECRETAN
BY Moody and Goldman
ATTORNEYS March 28, 1961 F. SECRETAN 2,977,538
PHASE MEASURING SYSTEM
Filed Dec. 11, 1958 2 Sheets-Sheet 2
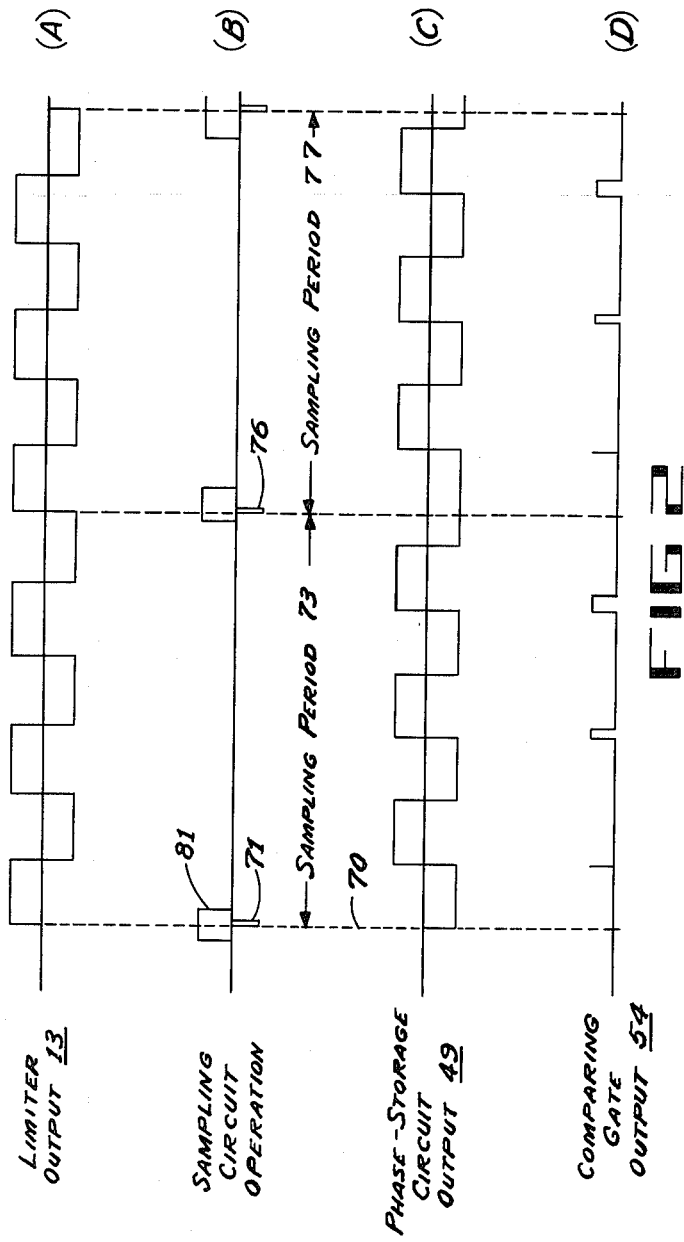
INVENTOR.
FRANK SECRETAN
BY Moody and Goldman
ATTORNEYS

United States Patent Office 2,977,538
Patented Mar. 28, 1961

2,977,538

PHASE MEASURING SYSTEM

Frank Secretan, West Los Angeles, Calif., assignor to Collins Radio Company, Cedar Rapids, Iowa, a corporation of Iowa Filed Dec. 11, 1958, Ser. No. 779,713

9 Claims. (Cl. 324—83)

This invention is particularly adaptable for measuring phase variations of a radio wave.

Many types of radio frequency communication systems are limited by the degree of phase stability of its signal being propagated through the ether. Such phase variation is random to a large extent, since it is caused by the forces of nature. However, knowledge of its distribution and amount assists man in determining the communication system that is most adaptable to the phase disturbances.

Propagation phase variations are affected by the choice of radio frequency at a particular time, such as the time of day, the season, and by terrain conditions, etc. For example, a digital communication system which is particularly immune to many types of phase disturbances is explained in patent application Serial No. 502,045 titled "High Speed Transmission of Messages" by Melvin L. Doelz and Dean F. Babcock, filed April 18, 1955, and assigned to the same assignee as the present application, and now Patent No. 2,905,812. However, with such a system, knowledge of propagation phase variations may determine the optimum design characteristics of a system, such as the bit rate to be used, and the optimum carrier frequency.

It is, therefore, an object of this invention to provide a means for measuring phase variations of a radio wave propagated through a medium having phase instabilities.

It is another object of this invention to provide a measuring system for determining the average phase variation of a propagated wave over periodic time intervals.

The invention uses a variable pulse-oscillator having a subaudio-to-audio frequency range for determining sampling periods over which average phase variations are to be measured. The propagated wave is received, and stably heterodyned to a low frequency, and axis-crossing pulses are generated from it to signify its phase. A phase-storage circuit is periodically reset by an axis-crossing pulse at the beginning of each sampling period. A phase comparator receives the heterodyned wave and the output of the phase-storage circuit. The amount that the phase of the received wave has drifted from the stored phase by the end of each sampling period represents a differential phase drift, when the sampling period is small compared to the rate of phase drift. Recording means is connected to the output of the phase comparator to store the measurements for later analysis.

Further objects, features and advantages of the invention will become apparent to one skilled in the art upon further study of the specification and the accompanying drawings in which:

Figure 1 illustrates an embodiment of the invention, and

Figures 2(A)–(D) illustrate waveforms used in explaining the operation of the invention.

The drawings will now be considered in an explanation of an embodiment of the invention. In Figure 1 an antenna 10 receives a wave which is being propagated through an unstable phase medium, such as through the atmosphere. The wave received by antenna 10 is being transmitted at a single frequency from a transmitter that is phase stable compared to phase instability caused by the medium of transmission. A radio receiver 11 receives the output of antenna 10 and stability heterodynes it to an audio-frequency level $f_1$. Accordingly, receiver 11 includes a local heterodyning source having a much higher order of phase stability than the received signal. Thus, any phase variation at the receiver output is primarily chargeable to instability of the propagation medium.

An amplifier-limiter 12 is connected to the output of receiver 11 and clips the positive and negative peaks from the received wave, making it a square-wave having a fifty percent duty cycle at a repetition rate $f_1$.

A phase-storage circuit 30 is provided to store the phase of the received wave existing at the beginning of a sampling period. The sampling periods are determined by an oscillator 20, which, for example, may be set anywhere within a range from $\frac{1}{20}$ to 200 cycles per second. A limiter 21 and a differentiator 22 are respectively connected to an output of oscillator 20, to generate pulses. A pulsed output 23 of very short duty cycle is provided from differentiator 22, and the time elapsing between any two adjacent pulses is a sampling period.

Phase-storage circuit 30 provides an output wave which has the frequency $f_1$ of the heterodyned signal. Circuit 30 has its phase reset to that of the heterodyned signal at the beginning of each sampling period. The stored phase is then compared with the incoming phase over each sampling period.

Phase-storage circuit 30 is described and claimed in patent application Serial No. 732,900, filed May 5, 1958, titled "Digital Phase Storage Circuit," invented by the same inventor and assigned to the same assignee as the present application. Hence, a detailed discussion of phase storage circuit 30 is not given herein. However, briefly it comprises a crystal oscillator 34, a pulse former 36, and a plurality of binary frequency dividers 41–48 connected in tandem with oscillator 34. The binary dividers may be flip-flop circuits. Each of the dividers has a reset input 37, which receives reset pulses that can override tandem-provided pulses from a prior divider or pulse former 36. The last divider 48 provides the output 49 of phase-storage circuit 30. Output 49 is a square wave of fifty percent duty cycle having a repetition rate $f_1$ equal to the output frequency of receiver 11. The phase stability of output 49 is determined by the stability of oscillator 34. This phase stability is made much greater than that of a received wave.

The phase setting of circuit 30 is done at the beginning of each sampling period by an axis-crossing pulse generated by the received wave. Axis-crossing pulses are generated by a differentiator 14 and connected to the output of limiter 12. One positive (and negative) axis-crossing pulse is provided per cycle of the received wave at a crossing of the alternating-current axis. The time positions of the axis-crossings are a direct function of the phase of the received wave.

A one-pulse sampling circuit 35 is connected between differentiator 14 and the resetting input of storage circuit 30. Sampling circuit 35 permits one axis-crossing pulse to pass through it in response to a sampling pulse from oscillator 20, initiating a sampling period. Sampling circuit 35 includes a one-pulse gate 33 which has one input connected to differentiating circuit 14 to receive axis-crossing pulses, and the output of gate 33 is connected to resetting inputs 37 of dividers 41–48. Hence, an axis-crossing pulse from differentiator 14 is permitted to reset the binary dividers 41–48 only when gate 33 is enabled.

A bistable circuit 31 has its output connected to another input of gate 33. However, bistable circuit 31 has an input connected to differentiating circuit 22 to receive sampling pulses. As a result, a sampling pulse triggers bistable circuit 31 to enable gate 33 to pass the first received axis-crossing pulse. After the first axis-crossing pulse passes through gate 33, it is delayed slightly in a delay circuit 32 before it triggers another input of bistable circuit 31 to disable it and prevent any further axis-crossing pulses from passing through gate 33 until the next sampling pulse is provided.

The single axis-crossing pulse passing through gate 33 resets the output phase of circuit 30 to correspond to the phase of the input wave existing at the instant of the sampled axis-crossing pulse. The above-cited application, No. 732,900, describes the resetting and phase-storing operation of circuit 30.

However, it is well known that a bistable circuit connected as a frequency divider can provide a pair of oppositely-phased outputs. Thus, instead of using the in-phase output from the last divider 48, its opposite phased input may be used. Thus, whenever phase-storage circuit 30 is reset by an axis-crossing pulse, the phase at output 49 is 180 degrees with respect to the received wave.

Phase detection between the incoming and stored waves is accomplished by a comparing gate 53 that has a pair of inputs which respectively receive the square-wave outputs 13 and 49 of limiter 12 and storage circuit 30, respectively. Gate 53 is a coincidence gate or "and" gate, and hence provides an output only when receiving simultaneous inputs of a given polarity, which in the illustrated embodiment is presumed to be positive polarity. Hence, output 54 of gate 53 provides no signal as long as the phase of the incoming wave does not deviate from the stored phase. However, if the incoming wave should vary its phase, pulses will be provided from gate 54 with pulse widths that vary in proportion to the phase deviation.

Figure 2(A) illustrates an output 13 from amplifier-limiter 12. Pulse 71 in Figure 2(B) represents an axis-crossing pulse which is passed through sampling circuit 35 in response to an enabling sampling pulse 81. Thus, pulse 71 resets the phase of output 49 to that shown in Figure 2(C) at time instant 70. However, over a sampling period 73, the phase of the incoming wave varies. Accordingly, the pulses shown in Figure 2(D) have widths varying with the degree of phase variation over period 73.

Next sampled axis-crossing pulse 76 again resets the phase of storage circuit output 49 to 180 degrees with respect to the incoming wave, and during the next sampling period 77 the pulse widths provided from gate 54 are also illustrated in Figure 2(D).

There are several ways of measuring the pulse-width variations over each sampling period. A precise way of measuring it is by using a high-repetition-rate pulse source 51—52 in Figure 1, and by counting its pulses that occur during the output pulses from gate 53. This is done with the assistance of a recording pulse counter 60 which has a reset input connected to the sampling-pulsed output of differentiator 22, so that counter 60 is reset to zero upon the reception of each sampling pulse. Furthermomre, a camera 64 is provided to snap a picture of the reading registered on pulse counter 60 at the end of each sampling period. Hence, camera 64 is also connected to the output of differentiating circuit 22 so that it snaps a picture immediately prior to reset of counter 60 by a sampling pulse. There are many types of pulse counters available on the market which can be used as counter 60.

An input 58 of counter 60 receives pulses to be counted. Input 58 is connected to the output of a counter gate 56, and it has an enabling input connected to output 54 of comparing gate 53. Another input 57 of counter gate 56 receives the fixed-rate pulses from pulse source 51—52. The fixed-rate pulses at input 57 are generated by a fixed oscillator 51 and a pulse former 52 which generates pulses at a 360 kilocycle-per-second repetition rate. However, the choice of frequency of fixed oscillator 51 is arbitrary. The number of pulses counted over a sampling period is directly proportional to the average phase variation of the input wave over the sampling period.

Another technique for measuring the phase variation of the incoming wave is to provide an integrator 61 which has an input connected to the output of comparing gate 53. Integrator 61 is a low-pass filter with an adjustable time constant, which is chosen between the fastest phase variation rate and the frequency of the detected wave. A pen recorder 62 is connected to the output of integrator 61 to provide a record of the phase variation. Thus, the pen recorder may have a roll of paper which moves under the pen at a constant speed and the transverse position of the pen is moved in proportion to the amplitude of the integrated signal output from integrator 61. A conventional phase detector of sufficient phase resolution may be substituted for the combination of gate 53 and integrator 61.

Although this invention has been described with respect to a particular embodiment thereof, it is not to be so limited as changes and modifications may be made therein which are within the full intended scope of the invention as defined by the appended claims.

I claim:

1. Means for determining the phase variation of a received tone, comprising means for detecting said tone, phase-storage means providing an output at the same frequency as said tone, means for sampling said tone at a given instant of time connected between said detecting means and said phase-storage means, means included with said phase-storage means for resetting the output of said phase-storage circuit to the phase of the received tone by actuation of said sampling means, means for comparing the phase between the output of said phase-storage circuit and said received tone over a period of time.

2. A system for determining phase variation of a received tone, comprising means for generating pulses from said received tone, a phase-storage circuit having a resetting input and an output with a frequency equal to the frequency of said tone, a one-pulse sampling circuit connected between the resetting input of said phase-storage circuit and said generating means, timing means for actuating said one-pulse sampling circuit, a comparator gate receiving pulses from said generating means and the output of said phase-storage circuit, an output of said gate being proportional to the phase variation.

3. A system for determining the phase instability of a received frequency, comprising receiving means for heterodyning said received frequency to an audio tone, means for generating a square wave form said audio tone having the phase of the received frequency; a phase-storage circuit comprising a crystal oscillator and a plurality of frequency divider circuits connected in tandem with said crystal oscillator; a one-pulse sampling gate connected to said generating means, an overriding reset input of each divider circuit connected to the output of said one-pulse sampling gate, an output of said phase-storage circuit having a frequency equal to the repetition rate of said square wave, means for actuating said sampling circuit to pass a pulse of said generating means to said reset inputs in said phase-storage circuit to reset the phase of its output, and means for phase comparing the output of said phase-storage circuit with an output of said generating means.

4. A system for determining the phase instability of a received signal, comprising receiving means for translating said signal to an audio tone, an amplifier-limiter connected to said receiving means for generating a pulsed wave from said tone with a fifty percent duty cycle, a differentiator connected to the output of said limiter for generating pulses timed with the axis crossings of the received tone; a one-pulse sampling circuit, including a gate having one input connected to said differentiating circuit, a bistable circuit having an output connected to another input of said gate, and a delay circuit connected between the output of said gate and a resetting input of said bistable circuit; means providing sampling-period pulses connected to a triggering input of said bistable circuit; a phase-storage circuit including a stable oscillator, and a plurality of binary frequency dividers connected in tandem with said crystal oscillator, each of said binary dividers including an overriding reset input connected to the output of said gate, a last of said dividers providing an output wave having a repetition rate equal to the frequency of said tone, and phase comparing means connected to the output of said phase-storage circuit and to the output of said amplifier-limiter to register their relative phase.

5. A system as defined in claim 4 in which said means for generating sampling-period pulses is a low frequency oscillator, and a pulse former connected to the output of said oscillator to provide said sampling-period pulses.

6. A system as defined in claim 4 in which said phase comparing means is an "and" gate having a pair of inputs respectively connected to the outputs of said phase-storage circuit and said amplifier-limiter, with the widths of pulses provided from said "and" gate being proportional to said phase instability.

7. A system as defined in claim 6 in which an integrator is connected to an output of said "and" circuit, whereby the output of said integrator varies with said phase instability.

8. A system as defined in claim 7 in which a time-constant control is provided with said integrator, and a pen recorder is connected to the output of said integrator.

9. A system as defined in claim 6 further comprising a recording pulse counter having a zero resetting input receiving said sampling-period pulses, another "and" gate having one input connected to the output of said first "and" gate, the output of said second "and" gate connected to a counting input of said recording pulse counter, and means for generating pulses at a repetition rate many times greater than the repetition rate of the phase storage circuit output having an output connected to another input of said second "and" gate.

References Cited in the file of this patent

UNITED STATES PATENTS

| | | |
|---|---|---|
| 2,557,581 | Triman | June 19, 1951 |
| 2,621,238 | Palmer | Dec. 9, 1952 |
| 2,766,450 | Frank | Oct. 9, 1956 |
| 2,811,716 | Crist | Oct. 29, 1957 |
| 2,854,662 | Westwood | Sept. 30, 1958 |
| 2,877,416 | Grisdale | Mar. 10, 1959 |